United States Patent
Kaneda (10) Patent No.: US 7,123,135 B2
(45) Date of Patent: Oct. 17, 2006

(54) DISPLAY CONTROL DEVICE FOR VEHICLE

(75) Inventor: Kouji Kaneda, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 106 days.

(21) Appl. No.: 10/829,991

(22) Filed: Apr. 23, 2004

(65) Prior Publication Data

US 2004/0212482 A1 Oct. 28, 2004

(30) Foreign Application Priority Data

Apr. 24, 2003 (JP) ............ P. 2003-120302

(51) Int. Cl.
*B60Q 1/00* (2006.01)
(52) U.S. Cl. .......... 340/438; 340/459; 340/461; 340/691.6; 701/36
(58) Field of Classification Search ........... 340/438, 340/457, 458, 459, 461, 691.6, 332; 701/36
See application file for complete search history.

(56) References Cited

U.S. PATENT DOCUMENTS 5,121,112 A 6/1992 Nakadozono

| | | |
|---|---|---|
| 6,396,394 B1 | 5/2002 | Suzuki et al. |
| 6,812,942 B1 * | 11/2004 | Ribak .................. 701/211 |
| 2002/0140552 A1 | 10/2002 | Wada |
| 2003/0043048 A1 | 3/2003 | Wada et al. |

FOREIGN PATENT DOCUMENTS

| JP | 7-225246 | 8/1995 |
|---|---|---|
| JP | 07-225246 | 8/1995 |
| JP | 2002-114057 | 4/2002 |

OTHER PUBLICATIONS

European Search Report dated Sep. 3, 2004.

* cited by examiner

*Primary Examiner*—Daryl C Pope
(74) *Attorney, Agent, or Firm*—McGinn IP Law Group, PLLC (57) ABSTRACT

If a successive lighting operation inhibition mode is not set up, a pointer portion of a speed meter is lighted, and then a peripheral ring portion of the speed meter is lighted. On the other hand, if the successive lighting operation inhibition mode is set up, the peripheral ring portion and the pointer portion are lighted at once. Subsequently, if a sweep operation inhibition mode is not set up, a sweep operation of a meter pointer in the pointer portion is performed. Thereafter, a nameplate portion is lighted. On the other hand, if the sweep operation inhibition mode is set up, the nameplate portion is lighted instantly without performing the sweep operation.

18 Claims, 8 Drawing Sheets

DISPLAY CONTROL DEVICE FOR VEHICLE

BACKGROUND OF THE PRESENT INVENTION

1. Field of the Present Invention

The present invention relates to a display control device of a vehicle for displaying a designated vehicle information, particularly to the display control device for being able to change a display order of each meter.

2. Description of the Related Art

A vehicle is provided with a display device for a vehicle to display a vehicle condition, including a speed meter, an engine speed meter, a fuel quantity meter, an engine coolant temperature meter, and an odo trip meter. In such display device for the vehicle, some measures for displaying in a preset display mode based on an ON operation of an ignition key are taken to improve the merchantability and design property. That is, when the ignition key is turned ON, a meter pointer (needle) in a pointer portion is moved from zero to the maximum value (e.g., refer to JP-A-7-225246) (sweep operation), and a ring around the periphery of a speed meter or an engine speed meter, the meter pointer and a nameplate are lighted in succession.

By the way, the driver may think the sweep operation of the meter pointer and a successive lighting of the meter peripheral ring, the meter pointer and the like in a preset display mode unfavorable. However, in the display device for the vehicle, it is not permitted to change the preset display mode of making the sweep operation of the meter pointer, or the successive lighting of the meter peripheral ring, the meter pointer and the like.

SUMMARY OF THE PRESENT INVENTION

It is an object of the present invention to provide a display control device for a vehicle in which the preset display mode in making the ON operation of the ignition key can be changed.

The present invention provides a display control device for displaying in a preset display mode based on an operation of an ignition key, comprising: a display mode change instructing unit for instructing a change of the preset display mode, and a display mode changing unit for changing the preset display mode into a display mode different from the preset display mode upon an instruction from the display mode change instructing unit.

In the display control device for the vehicle according to the present invention, the preset display mode is changed into the display mode different from the preset display mode, based on the instruction from the display mode change instructing unit. Thereby, the preset display mode in operating the ignition key can be changed.

The present invention provides the display control device for the vehicle, wherein changing the preset display mode into the different display mode includes inhibiting the display in the preset display mode. In this case, the display in the preset display mode is inhibited based on the instruction from the display mode change instructing unit.

Also, the present invention provides the display control device for the vehicle, wherein the preset display mode is the mode in which a pointer portion is forced to make a sweep operation.

Also, the present invention provides the display control device for the vehicle, wherein the preset display mode is the mode in which illuminator portions within a meter cluster are lighted in succession.

Also, the present invention provides the display control device for the vehicle, further comprising a display portion for displaying an indication that the preset display mode is changed into the display mode different from the preset display mode. In this case, the driver is securely informed that the preset display mode is changed into the display mode different from the preset display mode.

Also, the present invention provides the display control device for the vehicle, wherein the display mode change instructing unit instructs a change of the preset display mode based on operations of an odo trip meter switch and the ignition key. In this case, the driver is prevented from mistaking an operation, and inhibited from making the operation while driving to secure the safety.

DETAILED DESCRIPTION OF THE PRESENT INVENTION

A display control device for a vehicle according to an embodiment of the present invention will be described below with reference to the accompanying drawings. In the description, the same parts or parts having the same function are designated by the same numerals, and the duplicate description is omitted.

Figure 1:
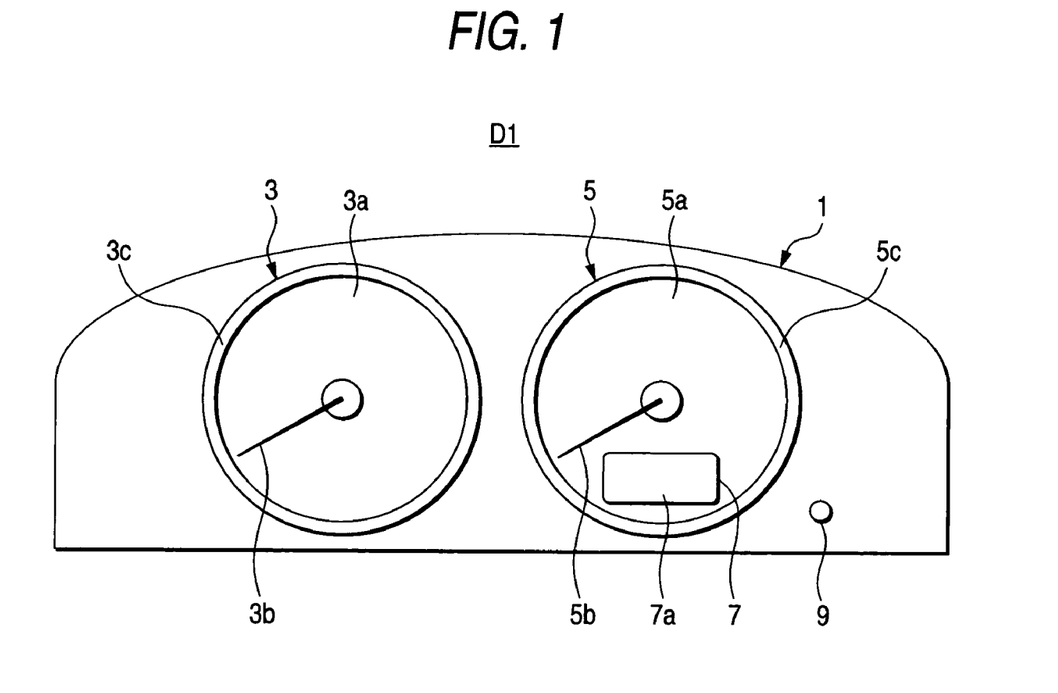
FIG. 1 is a schematic view showing a display device for a vehicle according to an embodiment of the present invention.

FIG. 1 is a schematic view showing a display device for the vehicle according to an embodiment of the present invention. As shown in FIG. 1, the display device for the vehicle D1 comprises, a speed meter 3, an engine rotating speed meter (hereinafter referred to as a tachometer) 5, an odo trip meter 7, a fuel quantity meter (not shown), and an engine water temperature meter (not shown) within a meter cluster 1. The speed meter 3 has a nameplate portion 3a, a pointer portion 3b and a peripheral ring portion 3c, and the tachometer 5 has a nameplate portion 5a, a pointer portion 5b and a peripheral ring portion 5c. The odo trip meter 7 has a display LCD 7a. Also, an odo trip meter switch 9 is provided within the meter cluster 1.

Figure 2:
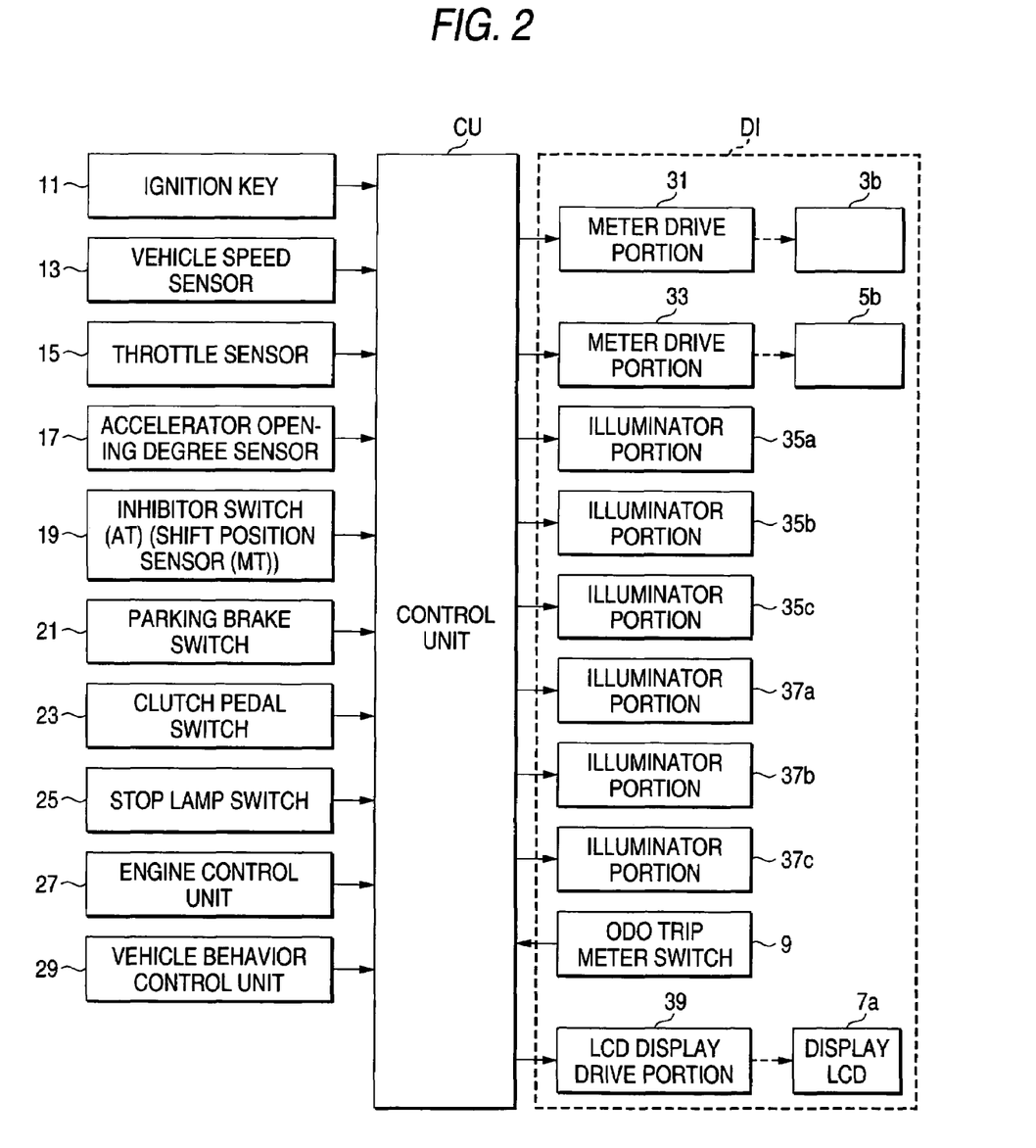
FIG. 2 is a block diagram showing a display control device for a vehicle according to the embodiment.

Also, the display device for vehicle D1 is connected to a control unit CU, as shown in FIG. 2. That is, the control unit CU is connected via a meter drive portion 31 to the pointer portion 3b of the speed meter 3, and via a meter drive portion 33 to the pointer portion 5b of the tachometer 5. Also, the control unit CU is connected to an illuminator portion 35a for lighting the nameplate portion 3a of the speed meter 3, an illuminator portion 35b for lighting the pointer portion 3b of the speed meter 3, and an illuminator portion 35c for lighting the peripheral ring portion 3c of the speed meter 3. Moreover, the control unit CU is connected to an illuminator portion 37a for lighting the nameplate portion 5a of the tachometer 5, an illuminator portion 37b for lighting the pointer portion 5b of the tachometer 5 and an illuminator portion 37c for lighting the peripheral ring portion 5c of the tachometer 5.

Also, the control unit CU is connected to an ignition key 11 for starting the engine to input an ON/OFF signal of the ignition key 11. Also, the control unit CU is connected to a vehicle speed sensor 13 for sensing the vehicle speed to input a pulse signal indicating the vehicle speed. Also, the control unit CU is connected to a throttle sensor 15 for sensing an opening degree of a throttle valve to input a signal indicating the throttle opening degree. Also, the control unit CU is connected to an accelerator opening degree sensor 17 for sensing an accelerator opening degree to input a signal indicating the accelerator opening degree.

Also, the control unit CU is connected to an inhibitor switch 19 to input a signal indicating a shift state (shift D range signal) (in the case of a manual shift vehicle, a signal indicating a shift position is input from a shift position sensor). Also, the control unit CU is connected to a parking brake switch 21 to input an ON/OFF signal of the parking brake switch 21. Also, the control unit CU is connected to a clutch pedal switch 23 to input an ON/OFF signal of the clutch pedal switch 23. Also, the control unit CU is connected to a stop lamp switch 25 to input an ON/OFF signal of the stop lamp switch 25.

Moreover, the control unit CU is connected to an engine control unit 27 to input a signal indicating a fuel injection amount from the engine control unit 27 and a drive signal of a fuel pump (a change in the voltage of the drive signal of the fuel pump). Also, the control unit CU is connected to a vehicle behavior control unit 29 to input a signal indicating an accelerating condition of the vehicle.

Figure 3A:
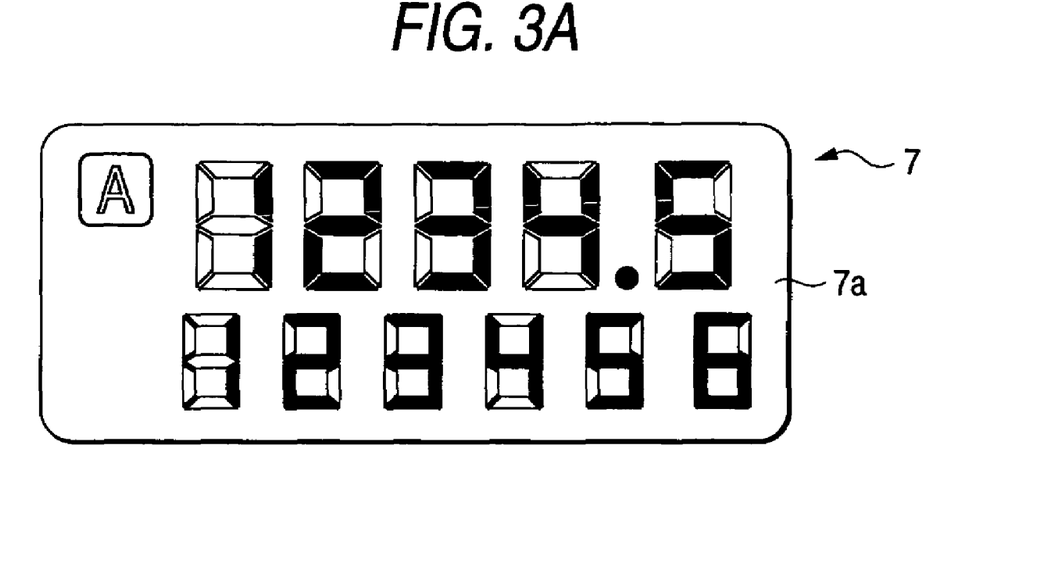
FIGS. 3A and 3B are views showing display states of an odo trip meter included in the display device for the vehicle according to the embodiment.
Figure 3B:
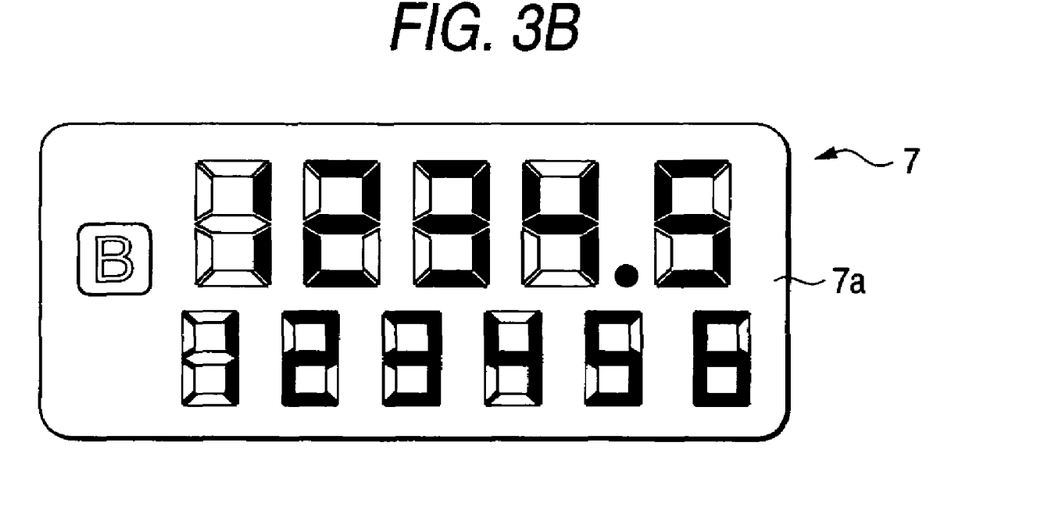

Also, the control unit CU is connected to the display LCD 7a via an LCD display drive portion 39. Also, the control unit CU is connected to the odo trip meter switch 9 to input an operation signal. The odo trip meter switch 9 makes a switching between a plurality of (e.g., two) trip meters that are displayed on the odo trip meter 7 (display LCD 7a), as shown in FIGS. 3A and 3B. For example, if the odo trip meter switch 9 is pushed for less than a predetermined time (e.g., 0.8 sec) in a display state as shown in FIG. 3A, the control unit CU switches the display of the odo trip meter 7 into a display state as shown in FIG. 3B.

Figure 4:
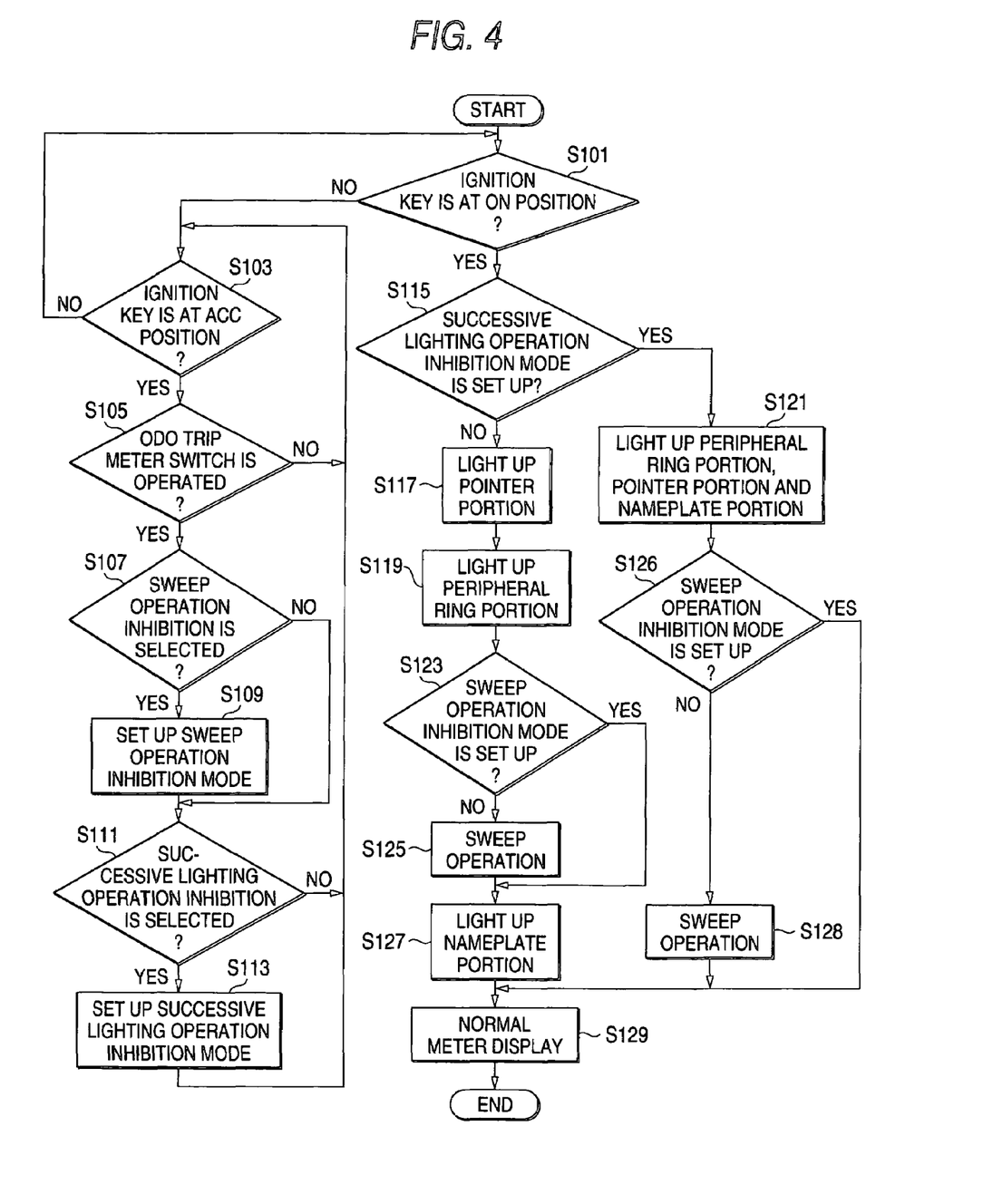
FIG. 4 is a flowchart for explaining the operation of the display control device for the vehicle according to the embodiment.

Referring to a flowchart as shown in FIG. 4, an operation of the display control device for the vehicle will be described below. In the following, the display control for the speed meter 3 is explained, but the display control for the tachometer is operated in the same way.

First of all, in the control unit CU, it is determined whether or not the ignition key 11 is turned to an ON position, based on an output from the ignition key 11 (S101). If the ignition key 11 is not turned to the ON position ("NO" at S101), it is determined whether or not the ignition key 11 is turned to an ACC position (S103). If the ignition key 11 is turned to the ACC position ("YES" at S103), it is determined whether or not the odo trip meter switch 9 is operated on the basis of an operation signal from the odo trip meter switch 9 (S105).

Figure 5A:
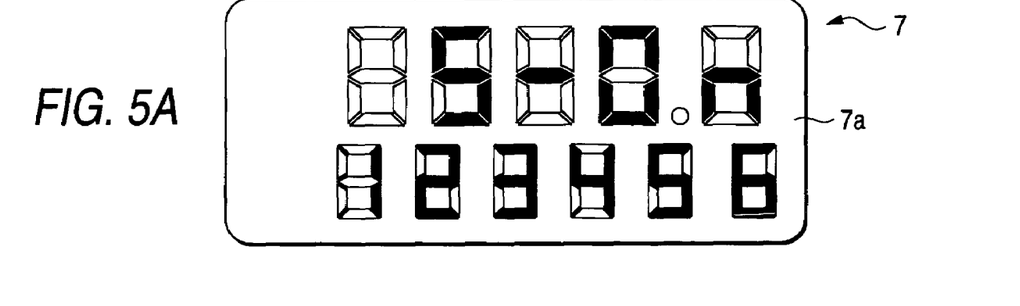
FIGS. 5A to 5D are views showing display states of the odo trip meter included in the display device for the vehicle according to the embodiment.
Figure 5B:
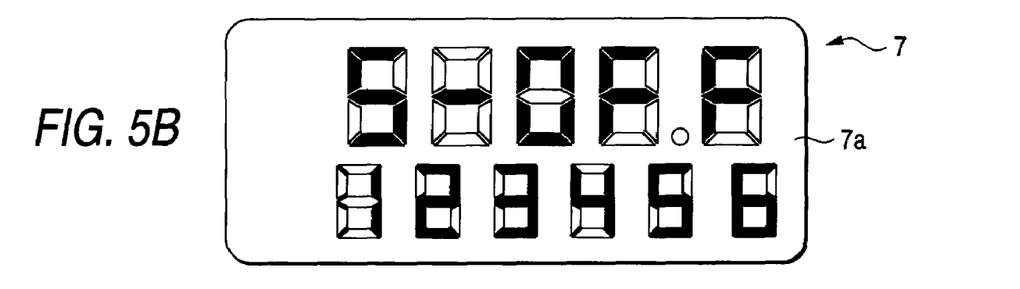

By the way, if the odo trip meter switch 9 is pushed for less than the predetermined time from a display state as shown in FIG. 3B, the odo trip meter switch 9 is changed into a sweep operation selection display state, as shown in FIG. 5A. In FIG. 5A, "S-On" indicating the selection of the sweep operation appears on the display LCD 7a of the odo trip meter 7. If the odo trip meter switch 9 is pushed for the predetermined time or more from the display state as shown in FIG. 5A, a sweep operation inhibition is selected, so that "S-Off" appears on the display LCD 7a, as shown in FIG. 5B. If the odo trip meter switch 9 is pushed for the predetermined time or more from the display state as shown in FIG. 5B, a sweep operation is selected, so that "S-On" appears on the display LCD 7a, as shown in FIG. 5A.

If the odo trip meter switch 9 is operated ("YES" at S105), it is determined whether or not the sweep operation inhibition is selected by the operation (S107). If the sweep operation inhibition is selected ("YES" at S107), a sweep operation inhibition mode is set up (S109). That is, an instruction of selecting the sweep operation inhibition mode is made by operating the ignition key 11 and the odo trip meter switch 9, so that the sweep operation inhibition mode is set up in the control unit CU, based on the instruction.

Figure 5C:
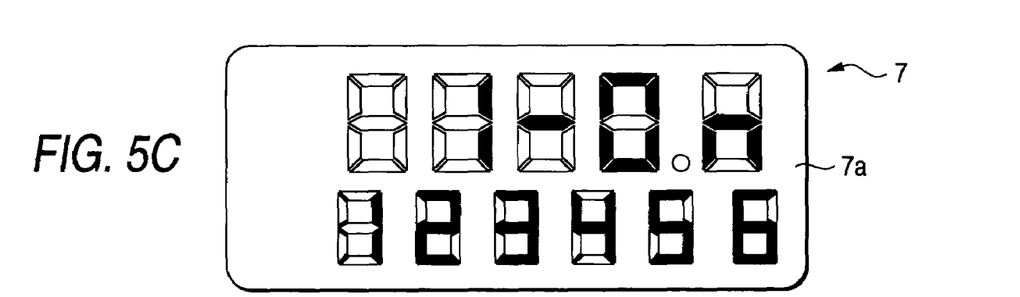
Figure 5D:
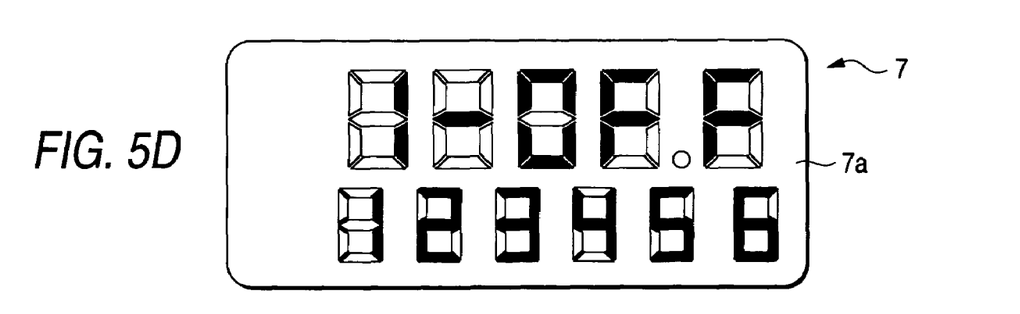

By the way, if the odo trip meter switch 9 is pushed for less than the predetermined time from the display state as shown in FIG. 5A or 5B, the odo trip meter switch 9 is changed into a successive lighting operation selection display state as shown in FIG. 5C. In FIG. 5C, "I-On" indicating the selection of a successive lighting operation appears on the display LCD 7a. And if the odo trip meter switch 9 is pushed for the predetermined time or more from the display state as shown in FIG. 5C, a successive lighting operation inhibition is selected, so that "I-OFF" is displayed on the display LCD 7a as shown in FIG. 5D. Also, if the odo trip meter switch 9 is pushed for the predetermined time or more from the display state as shown in FIG. 5D, the successive lighting operation is selected, so that "I-On" is displayed on the display LCD 7a as shown in FIG. 5C.

If the odo trip meter switch 9 is pushed for less than the predetermined time from the display state as shown in FIG. 5C or 5D, the display of the odo trip meter switch 9 is changed into the display state as shown in FIG. 3A. If the ignition key 11 is turned to other than the ACC position from the display state as shown in FIGS. 5A to 5D, the sweep operation selection display state or successive lighting operation selection display state is canceled, so that the display of the odo trip meter 7 is changed into the display state as shown in FIG. 3A.

It is determined whether or not the successive lighting operation inhibition is selected by the operation of the odo trip meter switch 9 (S111). If the successive lighting operation inhibition is selected ("YES" at S111), the successive lighting operation inhibition mode is set up (S113). That is, an instruction of selecting the successive lighting operation inhibition mode is made by operating the ignition key 11 and the odo trip meter switch 9, whereby the successive lighting operation inhibition mode is set up in the control unit CU based on the instruction.

Figure 6A:
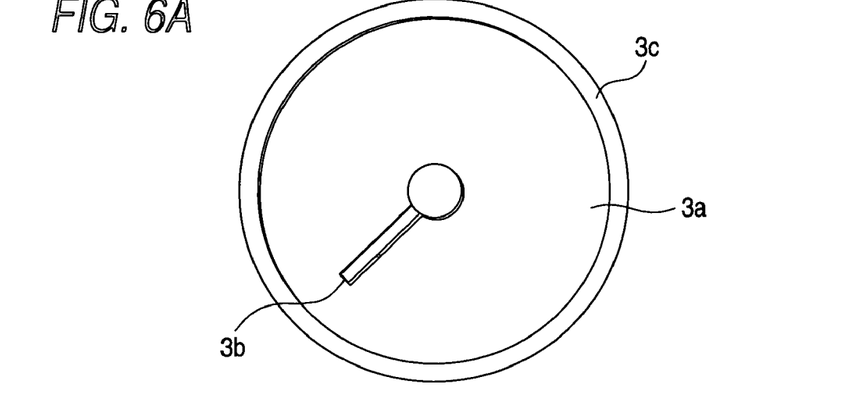
FIGS. 6A to 6C are views showing display states of a speed meter included in the display device for the vehicle according to the embodiment.
Figure 6B:
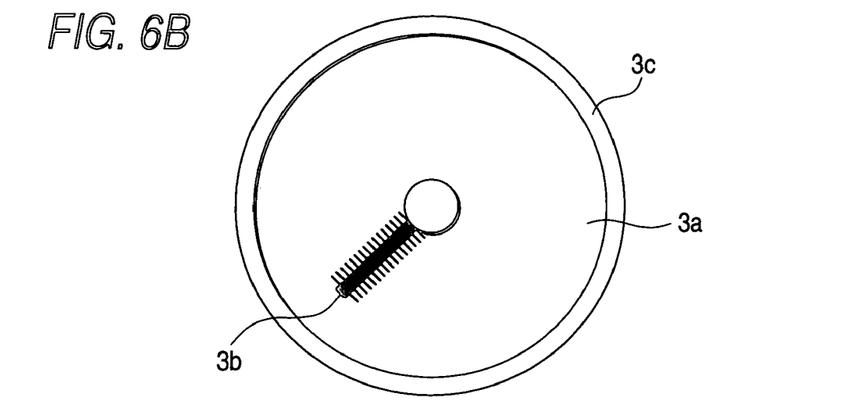

On the other hand, if the ignition key 11 is turned to the ON position ("YES" at S101), it is determined whether or not the successive lighting operation inhibition mode is set up (S115). If the successive lighting operation inhibition mode is not set up ("NO" at S115), the display of the speed meter 3 is transferred from the display as shown in FIG. 6A to the display as shown in FIG. 6B. That is, the pointer portion 3b of the speed meter 3 is lighted as shown in FIG. 6B (S117). That is, the control unit CU outputs a control signal to the illuminator portion 35*b* for lighting the pointer portion 3*b* of the speed meter 3, so that the pointer portion 3*b* is lighted.

Figure 6C:
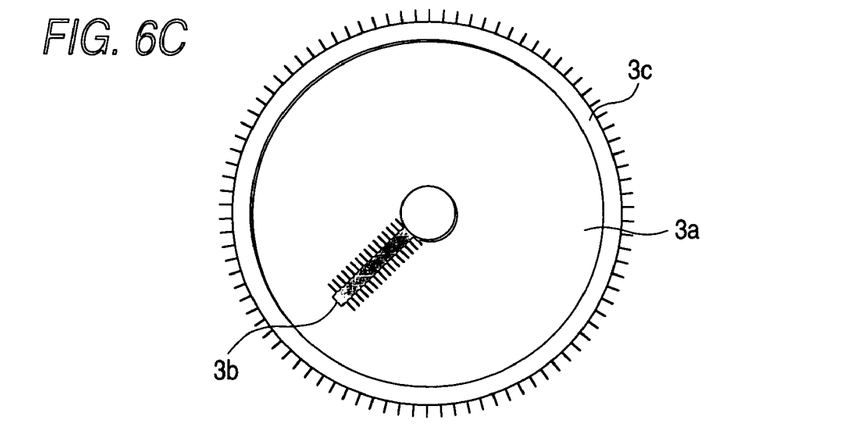

Then, the peripheral ring portion 3*c* is lighted (S119) as shown in FIG. 6C. That is, the control unit CU outputs a control signal to the illuminator portion 35*c* for lighting the peripheral ring portion 3*c* of the speed meter 3, so that the peripheral ring portion 3*c* is lighted.

Figure 7A:
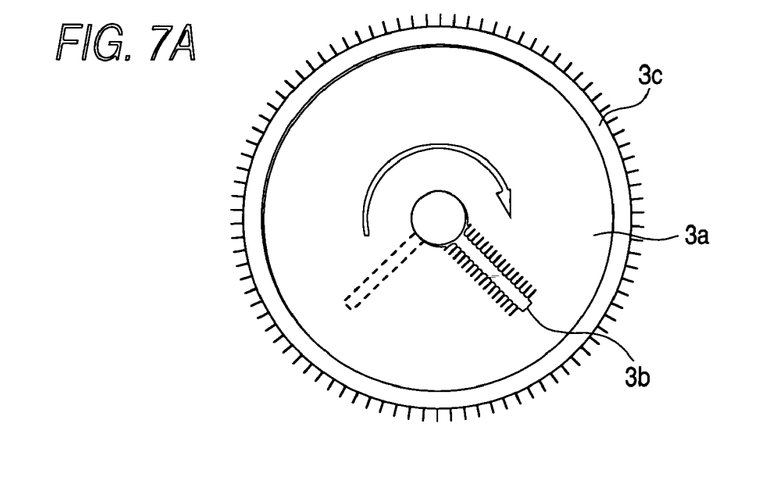
FIGS. 7A to 7C are views showing the display states of the speed meter included in the display device for the vehicle according to the embodiment.
Figure 7B:
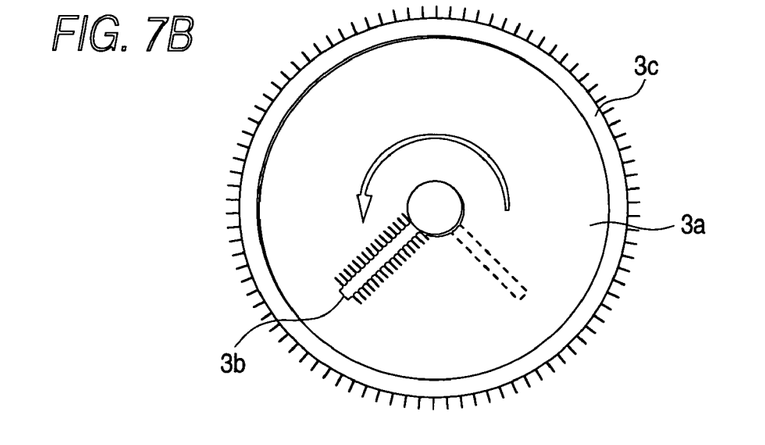

Subsequently, it is determined whether or not the sweep operation inhibition mode is set up (S123). If the sweep operation inhibition mode is not set up ("NO" at S123), the sweep operation of a meter pointer in the pointer portion 3*b* is performed (S125). The sweep operation is performed by outputting a control signal from the control unit CU to the meter drive portion 31. First of all, the meter pointer is moved to the maximum value, as shown in FIG. 7A, and then returned to zero as shown in FIG. 7B.

Figure 7C:
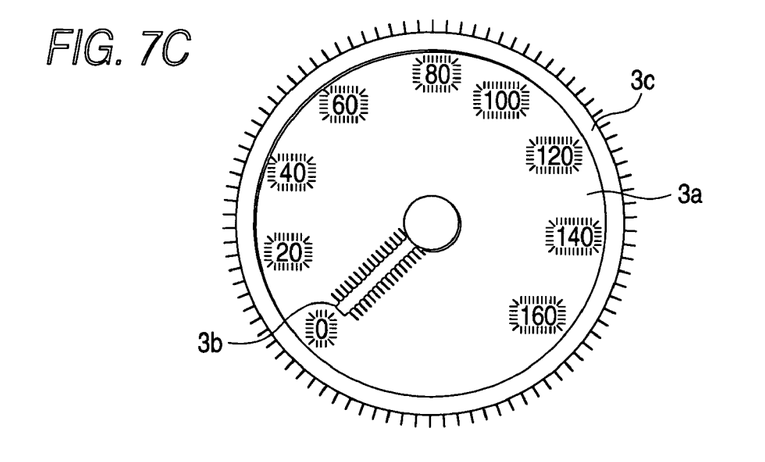

Thereafter, the nameplate portion 3*a* is lighted (S127) as shown in FIG. 7C. That is, the control unit CU outputs a control to the illuminator portion 35*a* for lighting the nameplate portion 3*a* of the speed meter 3, so that the nameplate portion 3*a* is lighted. Thereby, a normal meter display is made based on a pulse signal from the vehicle speed sensor 13 (S129).

On the other hand, if the sweep operation inhibition mode is set up ("YES" at S125), the nameplate portion 3*a* is lighted instantly without performing the sweep operation (S127), as shown in FIG. 7C. Then, the normal meter display is made (S129).

On the other hand, if the successive lighting operation inhibition mode is set up ("YES" at S115), the peripheral ring portion 3*c*, the pointer portion 3*b* and the nameplate portion 3*a* are lighted at once (S121). That is, the control unit CU outputs a control signal to the illuminator portion 35*c* for lighting the peripheral ring portion 3*c* of the speed meter 3, the illuminator portion 35*b* for lighting the pointer portion 3*b* of the speed meter 3, and the illuminator portion 35*a* for lighting the nameplate portion 3*a*, so that the pointer portion 3*b*, the peripheral ring portion 3*c* and the nameplate portion 3*a* are lighted.

Subsequently, it is determined whether or not the sweep operation inhibition mode is set up (S126). If the sweep operation inhibition mode is not set up ("NO" at S126), the sweep operation of the meter pointer in the pointer portion 3*b* is performed (S128). Thereafter, the normal meter display based on a pulse signal from the vehicle speed sensor 13 is made (S129).

On the other hand, if the sweep operation inhibition mode is set up ("YES" at S126), the normal meter display is directly performed (S129) without the sweep operation.

Accordingly, if the successive lighting operation inhibition mode and the sweep operation inhibition mode are not set up, the pointer portion 3*b* and the peripheral ring portion 3*c* are lighted in succession, and the sweep operation of the meter pointer is performed, whereby the speed meter 3 is displayed in the display mode (preset display mode) of the successive lighting operation and the sweep operation. Also, if the sweep operation inhibition mode is set up, the pointer portion 3*b* and the peripheral ring portion 3*c* are lighted in succession, and the nameplate portion 3*a* is lighted instantly, whereby the speed meter 3 is changed and displayed in the display mode in which the sweep operation is inhibited (different from the preset display mode). Also, if the successive lighting operation inhibition mode is set up, the pointer portion 3*b*, the peripheral ring portion 3*c* and the nameplate portion 3*a* are lighted at the same time, and the sweep operation of the meter pointer is performed, whereby the speed meter 3 is changed and displayed in the display mode in which the successive lighting operation is inhibited (different from the preset display mode). Moreover, if the successive lighting operation inhibition mode and the sweep operation inhibition mode are set up, the pointer portion 3*b*, the peripheral ring portion 3*c* and the nameplate portion 3*a* are lighted at the same time, whereby the speed meter 3 is changed and displayed in the display mode in which the successive lighting operation and the sweep operation are inhibited (different from the preset display mode).

As described above, in the display control device for the vehicle according to the embodiment, when an instruction of selecting the sweep operation inhibition mode is made by operating the ignition key 11 and the odo trip meter switch 9, the sweep operation inhibition mode is set up in the control unit CU based on the instruction, whereby the display mode of the speed meter 3 is changed into the display mode where the sweep operation is inhibited. Also, when an instruction of selecting the successive lighting operation inhibition mode is made by operating the ignition key 11 and the odo trip meter switch 9, the successive lighting operation inhibition mode is set up in the control unit CU based on the instruction, whereby the display mode of the speed meter 3 is changed into the display mode where the successive lighting operation is inhibited. Thereby, the display mode of the speed meter 3 in turning the ignition key on is changed.

Also, in the embodiment, the present invention is applied to the display mode of the display control device for the vehicle in turning the ignition key 11 to the ON position. However, the present invention may be applied to the display mode of the display control device for the vehicle when the ignition key is turned from the ACC position or ON position to the OFF position. Referring to a flowchart of FIG. 8, the operation of the display control device will be described in the case where the present invention is applied to the display mode of the display control device when the ignition key 11 is turned to the OFF position. In the following, the display control for the speed meter 3 is explained, but the display control for the tachometer may be executed with in the same way.

Figure 8:
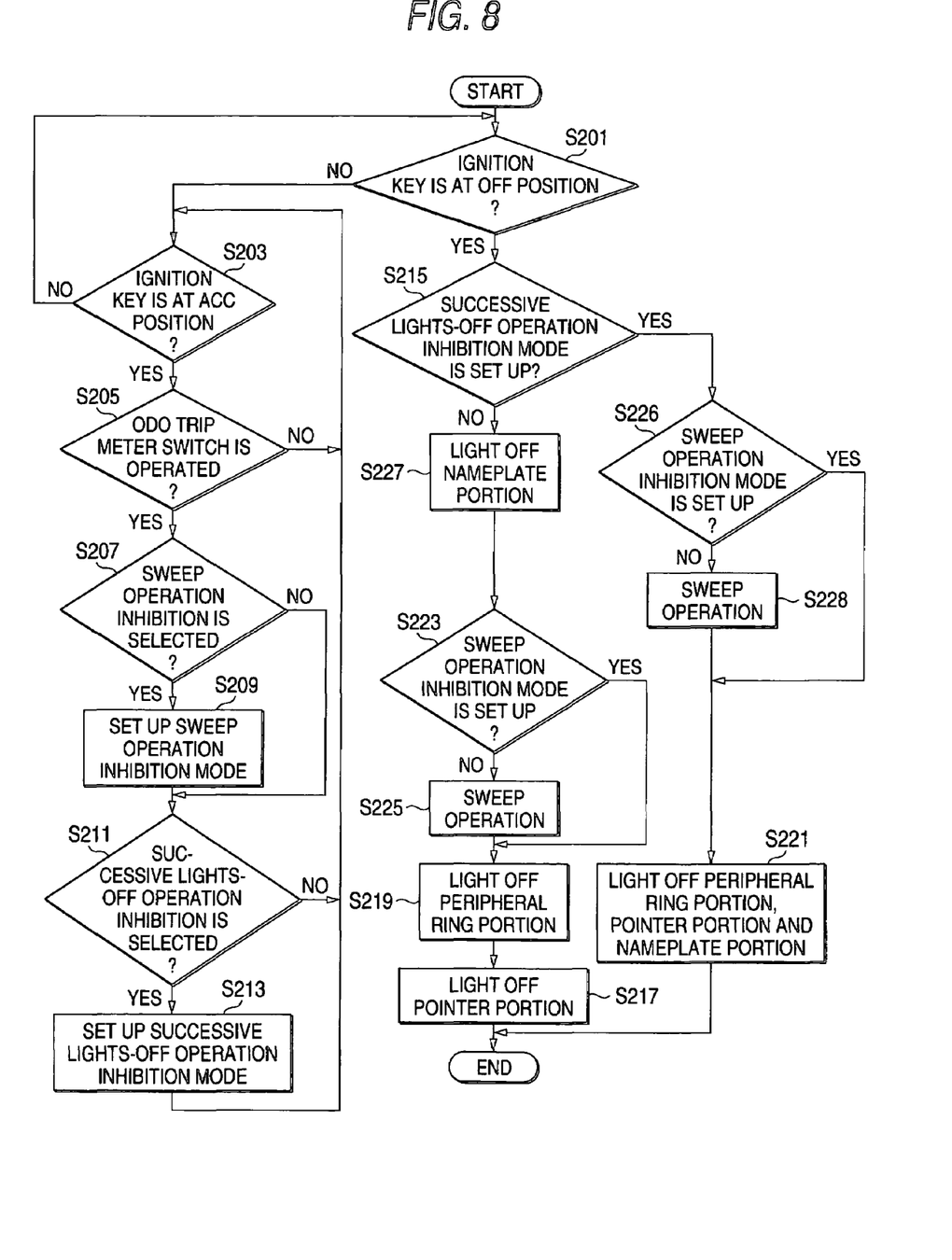
FIG. 8 is a flowchart for explaining the operation of the display control device according to the embodiment.

First of all, in the control unit CU, it is determined whether or not the ignition key 11 is turned to the ON position, based on an output from the ignition key 11 (S201). If the ignition key 11 is not turned to the ON position ("NO" at S201), it is determined whether or not the ignition key 11 is turned to the ACC position (S203). If the ignition key 11 is turned to the ACC position ("YES" at S203), it is determined whether or not the odo trip meter switch 9 is operated based on an operation signal from the odo trip meter switch 9 (S205).

If the odo trip meter 9 is operated ("YES" at S205), it is determined whether or not the sweep operation inhibition is selected by the operation (S207). If the sweep operation inhibition is selected ("YES" at S207), the sweep operation inhibition mode is set up (S209). That is, an instruction of selecting the sweep operation inhibition mode is made by operating the ignition key 11 and the odo trip meter switch 9, so that the sweep operation inhibition mode is set up in the control unit CU, based on the instruction.

And it is determined whether or not the successive lights-off operation inhibition is selected by the operation of the odo trip meter switch 9 (S211). If the successive lights-off operation inhibition is selected ("YES" at S211), the successive lights-off operation inhibition mode is set up (S213). The selection of the successive lights-off operation inhibition may be linked with the selection of the successive lighting operation inhibition. That is, with an instruction of selecting the successive lighting operation inhibition mode by operating the ignition key 11 and the odo trip meter switch 9, an instruction of selecting the successive lights-off operation inhibition mode is also made, whereby the successive lights-off operation inhibition mode is set up in the control unit CU based on the instruction.

On the other hand, if the ignition key 11 is turned to the OFF position ("YES" at S201), an inverse operation to the operation in the display mode of the display control device when the ignition key 11 is turned to the ON position is performed. Firstly, it is determined whether or not the successive lights-off operation inhibition mode is set up (S215). If the successive lights-off operation inhibition mode is not set up ("NO" at S215), the display of the speed meter 3 is transferred from the display as shown in FIG. 6C to the display as shown in FIG. 6B. That is, the nameplate portion 3a of the speed meter 3 is lighted off as shown in FIG. 6B (S227). That is, the control unit CU outputs a control signal for putting out the light of the nameplate portion 3a of the speed meter 3 to the illuminator portion 35a, so that the nameplate portion is lighted off.

Then, it is determined whether or not the sweep operation inhibition mode is set up (S223). If the sweep operation inhibition mode is not set up ("NO" at S223), the sweep operation of the meter pointer in the pointer portion 3b is performed (S225). The sweep operation is performed by outputting a control signal from the control unit CU to the meter drive portion 31. First of all, the meter pointer is moved to the maximum value, as shown in FIG. 7A, and then returned to zero as shown in FIG. 7B.

Thereafter, the peripheral ring portion 3c is lighted off (S219). That is, the control unit CU outputs a control for putting out the light of the peripheral ring portion 3c of the speed meter 3 to the illuminator portion 35c, so that the peripheral ring portion 3c is lighted off.

Subsequently, the pointer portion 3b is lighted off (S217) That is, the control unit CU outputs a control for putting out the light of the pointer portion 3b of the speed meter 3 to the illuminator portion 35b, so that the pointer portion 3b is lighted off.

Also, if the sweep operation inhibition mode is set up ("YES" at S225), the sweep operation is not performed, and the peripheral ring portion 3c and the pointer portion 3b are lighted off in this order.

On the other hand, if the successive lights-off operation inhibition mode is set up ("YES" at S215), it is determined whether or not the sweep operation inhibition mode is set up (S226). If the sweep operation inhibition mode is not set up ("NO" at S226), the sweep operation of the meter pointer in the pointer portion 3b is performed (S228).

Subsequently, the nameplate portion 3a, the pointer portion 3b and the peripheral ring portion 3c are lighted off at the same time. That is, the control unit CU outputs a control signal for putting out the light of the nameplate portion 3a, the pointer portion 3b and the peripheral ring portion 3c of the speed meter 3 to the illuminator portions 35a, 35b and 35c, so that the nameplate portion 3a, the pointer portion 3b and the peripheral ring portion 3c of the speed meter 3 are lighted off at the same time.

Also, if the sweep operation inhibition mode is set up ("YES" at S226), the nameplate portion 3a, the pointer portion 3b and the peripheral ring portion 3c of the speed meter 3 are lighted off at the same time without the sweep operation. Accordingly, if the successive lights-off operation inhibition mode and the sweep operation inhibition mode are not set up, the nameplate portion 3a is lighted off and the sweep operation of the meter pointer is performed, and then the pointer portion 3b and the peripheral ring portion 3c are lighted off in succession, whereby the speed meter 3 is displayed in the display mode (preset display mode) of the successive lights-off operation and the sweep operation. Also, if the sweep operation inhibition mode is set up, the nameplate portion 3a, the peripheral ring portion 3c and the pointer portion 3b are lighted off in succession, whereby the speed meter 3 is changed and displayed in the display mode in which the sweep operation is inhibited (different from the preset display mode). Also, if the successive lighting operation inhibition mode is set up, and the sweep operation inhibition mode is not set up, after the sweep operation of the meter pointer is performed, the nameplate portion 3a, the peripheral ring portion 3c and the pointer portion 3b are lighted off at the same time, whereby the speed meter 3 is changed and displayed in the display mode in which the successive lights-off operation is inhibited (different from the preset display mode). Moreover, if the successive lights-off operation inhibition mode and the sweep operation inhibition mode are set up, the pointer portion 3b, the peripheral ring portion 3c and the nameplate portion 3a are lighted off at the same time, whereby the speed meter 3 is changed and displayed in the display mode in which the successive lighting operation and the sweep operation are inhibited (different from the preset display mode).

Also, in the embodiment, an indication that the sweep operation inhibition mode is set up or the successive lighting operation inhibition mode is set up is displayed on the odo trip meter 7. Thereby, an indication that the sweep operation inhibition mode is set up or the successive lighting operation inhibition mode is set up is securely informed to the driver.

Also, in the embodiment, the sweep operation inhibition mode or the successive lighting operation inhibition mode is set up (indicated) by operating the odd trip switch 9 and the ignition key 11. Thereby, the driver is prevented from making a maloperation, and inhibited from making the operation while driving to secure the safety.

The present invention is not limited to the above embodiment. For example, in the embodiment, the display mode can be changed for each of the successive lighting operation and the sweep operation, but the present invention is not limited thereto. The display mode may be changed only for the successive lighting operation or only for the sweep operation. Also, in the embodiment, the display modes of the speed meter 3 and the tachometer 5 are changed, but the present invention is not limited thereto. Only one of the display modes may be changed. Also, the display mode of the meter other than the speed meter 3 and the tachometer 5 may be changed.

Also, in the embodiment, the sweep operation inhibition mode or the successive lighting operation inhibition mode is selected by operating the ignition key 11 and the odo trip meter key switch 9, but the present invention is not limited thereto. The sweep operation inhibition mode or the successive lighting operation inhibition mode may be selected by operating the ignition key 11 and a door handle switch (e.g., operating a door handle in the state where the ignition key 11 is at the ACC position), operating the ignition key 11 and a power window switch (e.g., operating a power window in the state where the ignition key 11 is at the ACC position), or operating the ignition key 11 and various apparatuses (e.g., navigation system, audio, air conditioner, etc.) (e.g., operating a mode selection screen in the state where the ignition key 11 is at the ACC position).

Also, in the embodiment, an indication that the sweep operation inhibition mode is set up and an indication that the successive lighting operation inhibition mode is set up are displayed on the odo trip meter 7, but the present invention is not limited thereto. These indications may be displayed on the display portion of various apparatuses (e.g., navigation system, audio, air conditioner, etc.).

Also, in the embodiment, the sweep operation selection display state or the successive lighting operation selection display state is canceled by operating the ignition key 11 to the position other than the ACC, but the present invention is not limited thereto. The sweep operation selection display state or the successive lighting operation selection display state maybe canceled, based on a signal from the vehicle speed sensor 13, the signal from the throttle sensor 15, the signal from the accelerator opening degree sensor 17, the signal from an inhibitor switch 19, a signal from the parking brake switch 21, the signal from the clutch pedal switch 23, the signal from the stop lamp switch 25, a starter signal, and the signal from the engine control unit 27 during the normal driving operation.

Also, in the embodiment, the display device for the vehicle D1 is directly controlled by the control unit CD provided separately. However, the display device for the vehicle D1 may be controlled by a microcomputer provided within the display device for the vehicle D1, in which the microcomputer controls the meter drive portions, the illuminator portions, LCD, and the display drive portion on the basis of the information from the control unit CD.

Although the present invention has been described in details with reference to specific embodiments, it is clearly understood for skilled persons in the related art that various changes and modifications can be made without departing from the spirit and scope thereof.

This application is based on Japanese Patent Application No. 2003-120302, filed on Apr. 24, 2003, the content of which is incorporated herein by reference.

With the present invention, it is possible to provide the display device for the vehicle in which the preset display mode in making the ON operation of the ignition key can be changed.

What is claimed is:

1. A display control device for a vehicle for displaying in a preset display mode based or an operation of an ignition key, comprising:
   a display mode change instructing unit for instructing a change of the preset display mode; and
   a display mode changing unit for changing the preset display mode into a display mode different from the preset display mode upon an instruction from the display mode change instructing unit,
   wherein changing the preset display mode into the display mode different from the preset display mode includes inhibiting the display in the preset display mode.

2. The display control device according to claim 1, wherein:
   the preset display mode includes a mode wherein a pointer portion is forced to make a sweep operation.

3. The display control device according to claim 1, wherein:
   the preset display mode includes a mode wherein illuminator portions within a meter cluster are lighted in succession.

4. The display control device according to claim 1, wherein:
   the preset display mode includes a mode wherein illuminator portions within a meter cluster are lighted off in succession.

5. The display control device according to claim 1, further comprising:
   a display portion for displaying an indication wherein the preset display mode is changed into the display mode different from to preset display mode.

6. The display control device according to claim 1, wherein:
   the display mode change instructing unit instructs a change of the preset display mode based on operations of an odo trip meter switch and the ignition key.

7. A display control device for a vehicle for displaying in a preset display mode based on an operation of an ignition key, comprising:
   a display mode change instructing unit for instructing a change of the preset display mode; and
   a display mode changing unit for changing the preset display mode into a display mode different from the preset display mode upon an instruction from the display mode change instructing unit,
   wherein the operation of the ignition key includes turning the ignition key at least one of on and off, and
   wherein the display mode different from the preset display mode is displayed at a time of the operation in which the ignition key is turned at least one of on and off.

8. The display control device according to claim 7, wherein the display mode change instructing unit instructs a change of the preset display mode based on operations of the ignition key and at least one of a door handle switch, a power window switch, a navigation system switch, an audio system switch, and an air conditioner system switch.

9. The display control device according to claim 7, wherein the display mode comprises:
   a mode that controls a display order of each of a plurality of meters for displaying designated vehicle information of the vehicle.

10. The display control device according to claim 9, wherein the mode controls the display order of each of the plurality of meters of the display of the vehicle at the time of the operation in which the ignition key is turned at least one of on and off.

11. The display control device according to claim 9, wherein the mode that controls the display order of each of the plurality of meters for displaying designated vehicle information of the vehicle includes at least one of:
    a first mode wherein illuminator portions within each of the plurality of meters are at least one of lighted on and light off in succession, and
    a second mode wherein illuminator portions within each of the plurality of meters are at least one of lighted on and light off at a same time.

12. The display control device according to claim 9, wherein said plurality of meters includes at least one of a speed meter, a tachometer, an odo trip meter, a fuel quantity meter, and an engine water temperature meter.

13. The display control device according to claim 9, wherein changing the preset display mode into the display mode different from the preset display mode includes controlling the display order in at least one of the plurality of meters.

14. The display control device according to claim 9, wherein changing the preset display mode into the display mode different from the preset display mode includes controlling the display order in less than all of said plurality of meters.

15. The display control device according to claim 7, wherein the display mode comprises:

a mode that controls an inhibition of a sweep operation of a meter pointer of at least one of a plurality of meters for displaying designated vehicle information of the vehicle.

16. The display control device according to claim 15, wherein said plurality of meters includes at least one of a speed meter, a tachometer, an odo trip meter, a fuel quantity meter, and an engine water temperature meter.

17. The display control device according to claim 15, wherein changing the preset display mode into the display mode different from the preset display mode includes inhibiting the sweep operation in at least one of the plurality of meters.

18. The display control device according to claim 15, wherein changing the preset display mode into the display mode different from the preset display mode includes inhibiting the sweep operation in less than all of said plurality of meters.

* * * * *